Patented Dec. 26, 1939

2,184,279

UNITED STATES PATENT OFFICE 2,184,279

AMINO-ALIPHATIC SULPHONAMIDES AND PROCESS FOR PREPARING THEM

Walter G. Christiansen, Glen Ridge, N. J., assignor to E. R. Squibb & Sons, New York, N. Y., a corporation of New York No Drawing. Application November 27, 1937, Serial No. 176,889

11 Claims. (Cl. 260—556)

This invention relates to, and has for its object the provision of, certain amino aliphatic sulphonamides and a process of preparing them. These compounds are useful as chemotherapeutic agents, especially for combating invasions of streptococci and other cocci.

The compounds embraced by this invention comprise: amino-aliphatic-sulphonamides of the general formula

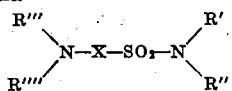

wherein X is an aliphatic hydrocarbon group (open-chain or cyclic, saturated or unsaturated) having no more than 6 carbon atoms, R′ and R″ represent hydrogen, alkyl, or hydroxy-alkyl, and R‴ and R⁗ represent hydrogen or alkyl; and acid-addition salts thereof. They may be prepared from N-(halo-aliphatic)-phthalimides by the following series of conversions:

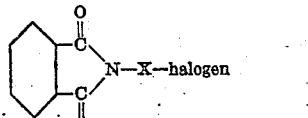

(A)

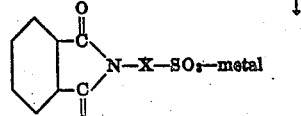

(B)

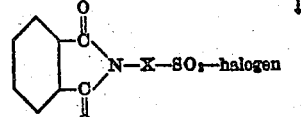

(C)

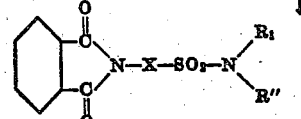

(D)

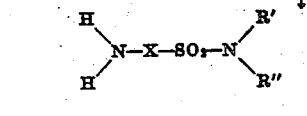

(E)

The free base may be recovered as such or in the form of its acid-addition salt, e. g., hydrochloride, sulphate, lactate, tartrate, borate, nitrate, picrate, citrate, or phosphate.

The following example is illustrative of the invention:

A. 300 grams of N-(β-bromoethyl)-phthalimide [preferably prepared by the method of Salzberg, Organic Syntheses, volume 7, page 9] is dissolved in 800 cc. of 95% alcohol and 18 cc. water. To this solution is added dropwise, during a period of about 2½ hours, a solution of 166 grams of anhydrous sodium sulphite in 660 cc. of water, while refluxing and stirring. The resulting mixture is refluxed for 4 or 5 hours after this addition has been completed, after which it is distilled to dryness. Then, after extracting the undesirable by-products therefrom with alcohol, the residue is taken up in 600 cc. of water. This solution is gradually evaporated to about ⅕ of its volume, and the sodium salt of β-phthalimido-ethyl-sulphonic acid which progressively crystallizes out during this evaporation is filtered off. The yield of product thus substantially freed from sodium bromide is about 30%.

B. 64.5 grams of the sodium salt of β-phthalimido-ethyl-sulphonic acid is mixed with 46.5 grams of PCl₅. After standing 30 minutes, this mixture is heated two hours at 100° C. After cooling this reaction mixture, the β-phthalimido-ethyl-sulphonyl-chloride is extracted with benzene and isolated in about 75% yield by removal of the benzene solvent by distillation.

C. A solution of 45.5 grams of β-phthalimido-ethyl-sulphonic-chloride is added to 250 cc. of benzene saturated with ammonia at 5 to 15° C., through which gaseous ammonia is continually passed to keep it saturated. The solid product which separates is dissolved in about a liter of hot water from which it crystallizes on cooling. A yield of about 30% of β-phthalimido-ethyl-sulphonamide melting at 201–206° C. (uncorrected) is obtained.

D. To 12.7 grams of β-phthalimido-ethyl-sulphonamide is added an equimolecular quantity (6 grams) of 42% aqueous hydrazine hydrate solution and 145 cc. of 95% alcohol. After refluxing about 30 minutes, the mixture is acidified to Congo red with dilute HCl, and the alcohol distilled off in vacuum. Then 75 cc. of 35–37% aqueous HCl is added, and this mixture refluxed with stirring until all of the solid material has dissolved. Upon cooling, a crystalline material, which is largely phthalic acid, separates and is filtered off. The filtrate is distilled to dryness in vacuum and the residue is recrystallized from methanol. A 50% yield of β-amino-ethyl-sulphonamide hydrochloride, melting at 132.5 to 133° C. (uncorrected), is obtained.

Compounds wherein X is an aliphatic hydrocarbon group other than ethyl may be prepared by starting with the corresponding N-(haloaliphatic)-phthalimide in the above-described procedure. Thus, gamma-amino-propyl-sulphonamide may be prepared by starting with N-(gamma-bromopropyl)-phthalimide; 1-amino-Delta²-butene-4-sulphonamide by starting with 4-bromo-Delta²-butenyl-phthalimide; and 4-amino-cyclohexane-1-sulphonamide by starting with 1-bromo-4-phthalimido-cyclohexane. Compounds wherein either or both of R' and R" are alkyl groups or hydroxyalkyl groups instead of hydrogen (as in the above specific example) may be prepared by using an alkylamine or hydroxy-alkylamine, respectively, in place of the ammonia in reaction (C) above; for example, by using methylamine, diethylamine, diethanolamine, or propanolamine, the compounds obtained are respectively β-amino-ethyl (N-methyl) sulphonamide, β-amino-ethyl (N-diethyl) sulphonamide, β-amino-ethyl (N-di-hydroxyethyl) sulphonamide, and β-amino-ethyl (N-hydroxypropyl) sulphonamide. Compounds wherein either or both of R''' and R'''' are alkyl groups instead of hydrogen may be prepared from the corresponding non-alkylated compounds by alkylating in the conventional manner [conversion (E) above]; e. g., N-dimethyl-β-amino-ethyl-sulphonamide may be prepared by treating β-amino-ethyl-sulphonamide with dimethyl sulphate. Manifestly, any combination of the radicals X, R', R", R''' and R'''' may be varied from those of the specific example by these procedures.

The free bases may be isolated from the acid-addition salts of the amino-aliphatic-sulphonamides by customary methods, e. g. by alkalinizing an aqueous solution of the salt with a large excess of potassium carbonate, extracting the liberated base with ether, and removing the ether by evaporation. Conversely, the free bases can be converted into acid-addition salts by neutralizing a solution of the base in a suitable solvent (e. g. methanol) with the desired acid, and isolating the salt by crystallization or by removing the solvent by evaporation.

The invention may be variously otherwise embodied, within the scope of the appended claims.

I claim:

1. A compound of the group consisting of: amino-aliphatic-sulphonamides of the general formula

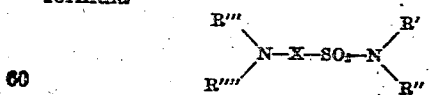

wherein X is an aliphatic hydrocarbon group having no more than six carbon atoms, R' and R" represent each a member of the group consisting of hydrogen, lower alkyl and hydroxy-(lower alkyl), and R''' and R'''' represent each a member of the group consisting of hydrogen and lower alkyl; and acid-addition salts thereof.

2. An amino-aliphatic-sulphonamide of the general formula

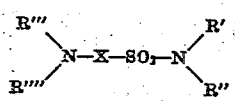

wherein X is an aliphatic hydrocarbon group having no more than six carbon atoms, R' and R" represent each a member of the group consisting of hydrogen, lower alkyl and hydroxy-(lower alkyl), and R''' and R'''' represent each a member of the group consisting of hydrogen and lower alkyl.

3. An amino-aliphatic-sulphonamide of the general formula

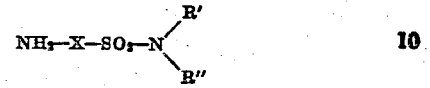

wherein X is an aliphatic hydrocarbon group having no more than six carbon atoms, and R' and R" represent each a member of the group consisting of hydrogen, lower alkyl and hydroxy-(lower alkyl).

4. An amino-aliphatic-sulphonamide of the general formula

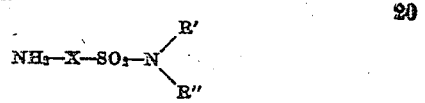

wherein X is an open-chain aliphatic hydrocarbon group having no more than six carbon atoms, and R' and R" represent each a member of the group consisting of hydrogen, lower alkyl and hydroxy-(lower alkyl).

5. An amino-aliphatic-sulphonamide of the general formula

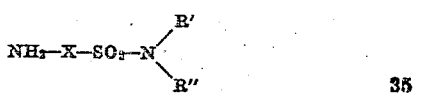

wherein X is a cycloaliphatic hydrocarbon group having no more than six carbon atoms, and R' and R" represent each a member of the group consisting of hydrogen, lower alkyl and hydroxy-(lower alkyl).

6. β-amino-ethyl-sulphonamide.
7. Gamma-amino-propyl-sulphonamide.
8. 4-amino-cyclohexane-1-sulphonamide.
9. The process of preparing compounds of the general formula.

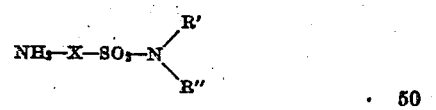

wherein X is an aliphatic hydrocarbon group having no more than six carbon atoms, and R' and R" represent each a member of the group consisting of hydrogen, lower alkyl and hydroxy-(lower alkyl), which comprises reacting a compound of the general formula

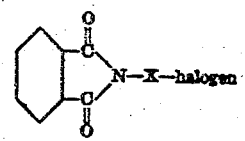

with an alkali metal sulphite, converting the resulting sulphonate into the corresponding sulphonyl halide, reacting the sulphonyl halide with a member of the group consisting of ammonia, alkylamines and hydroxy-alkylamines, and converting the resulting phthalimido-aliphatic-sulphonamide into the corresponding amino-aliphatic sulphonamide by hydrolysis.

10. The process of preparing β-amino-ethyl-sulphonamide which comprises reacting an N-(β-haloethyl)-phthalimide with an alkali metal sulphite, converting the resulting sulphonate into the corresponding sulphonyl halide, reacting the sulphonyl halide with ammonia, and reacting the resulting β-phthalimido-ethyl-sulphonamide with hydrazine hydrate.

11. A compound of the group consisting of aminoalkyl sulphonamides of the general formula $NH_2RSO_2NH_2$ wherein R is a lower alkylene group having at least two carbon atoms in the chain separating the amino and the sulphonamido group, and acid addition salts thereof.

WALTER G. CHRISTIANSEN.